United States Patent [19]

Lucero et al.

[11] 4,072,930

[45] Feb. 7, 1978

[54] MONITORING SYSTEM FOR USE WITH AMUSEMENT GAME DEVICES

[75] Inventors: Andres R. Lucero, Reno, Nev.; Roy E. Gilbert, Diamond Bar; Jack H. Stevens, South Pasadena, both of Calif.

[73] Assignee: Bally Manufacturing Corporation, Chicago, Ill.

[21] Appl. No.: 716,102

[22] Filed: Aug. 20, 1976

Related U.S. Application Data

[63] Continuation of Ser. No. 505,782, Sept. 13, 1974, abandoned.

[51] Int. Cl.[2] .......................... G06K 5/02; G06F 7/00; H04Q 9/00

[52] U.S. Cl. ............................ 340/152 T; 235/61.8 R; 235/92 GA; 340/323 R; 364/411; 364/412

[58] Field of Search ............ 340/152 R, 152 T, 172.5, 340/149 A, 323; 273/138 A, 139; 235/92 GA, 92 DP, 92 C, 151, 61.8 R

[56] References Cited

U.S. PATENT DOCUMENTS

| | | | |
|---|---|---|---|
| 3,560,715 | 2/1971 | Akamatsu | 340/149 A X |
| 3,662,343 | 5/1972 | Goldstein et al. | 340/149 R |
| 3,757,089 | 9/1973 | Hockler | 340/149 A X |
| 3,894,220 | 7/1975 | Levasseur | 235/151 |

*Primary Examiner*—Donald J. Yusko
*Attorney, Agent, or Firm*—Fitch, Even, Tabin & Luedeka

[57] ABSTRACT

A system for use in monitoring a plurality of amusement game devices is disclosed wherein individually identifiable attending personnel are employed to verify a predetermined game condition. The system is adapted for use with a computer and includes an interface unit connected to the computer and to a plurality of coupler units which are individually mounted on and interconnected with game devices. Each of the coupler units is adapted to receive a portable device for identifying individually each of the attending personnel. In the system illustrated in the drawings, that device is a transponder that locks into the coupler unit and provides informational responses to interrogation by the interface unit which sequentially polls or addresses each of the transponders. In the event a game device provides a winning condition, an operator inserts a transponder into the coupler unit of the game device that indicated the condition, which causes selective communication among the computer, coupler unit and transponder including identification of the game device, transponder, size of the winning condition and other information. The size of the winning condition is thereafter displayed on a digital readout, such as in the transponder, enabling the attending personnel to verify the condition. Once the amusement game device is then returned to playing condition, the transponder is unlocked and can be removed from the coupler unit and is available for insertion into other coupler units in response to winning conditions occurring thereon.

19 Claims, 26 Drawing Figures

Fig. 1.
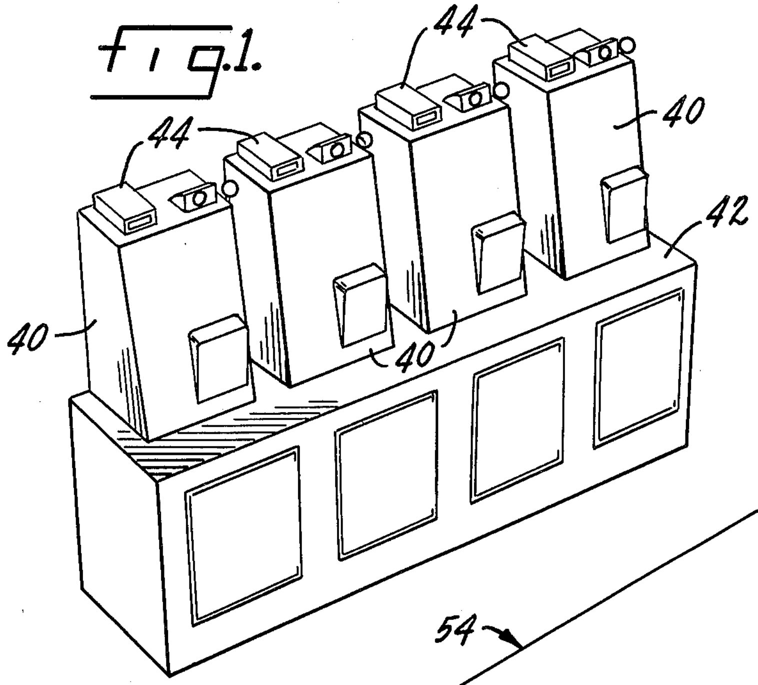
Fig. 2.
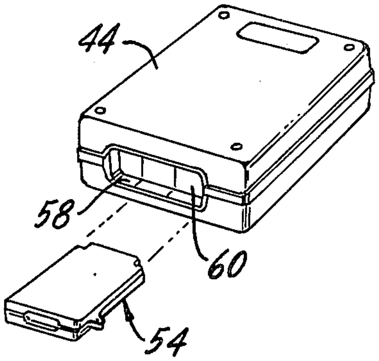
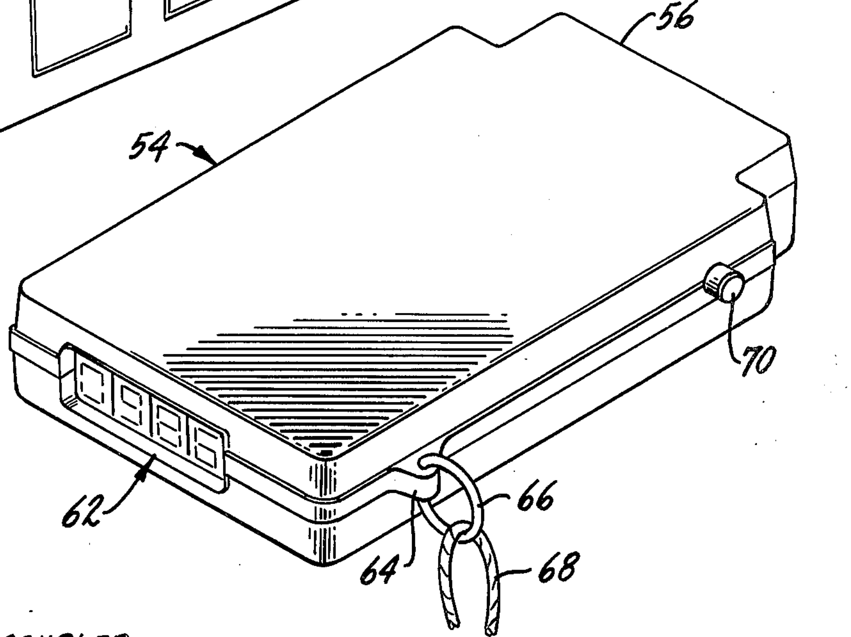
Fig. 3.
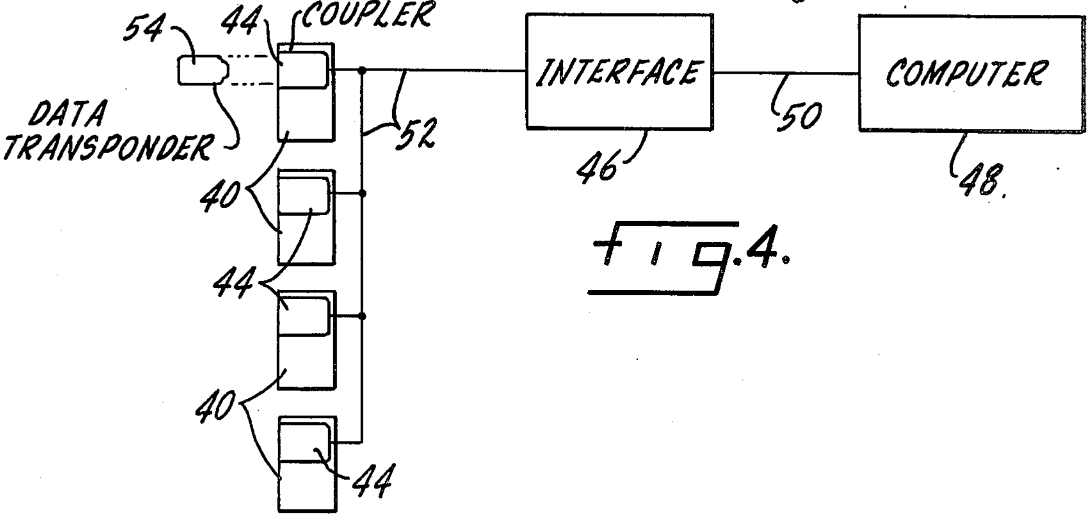
Fig. 4.

Fig. 5.
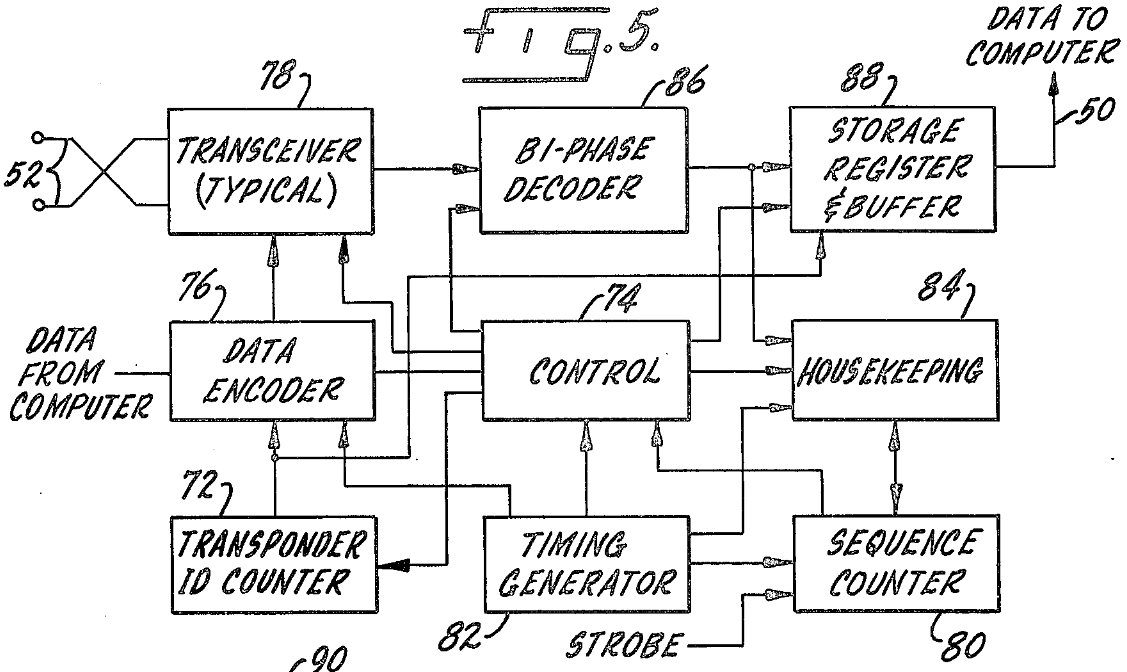
Fig. 6.
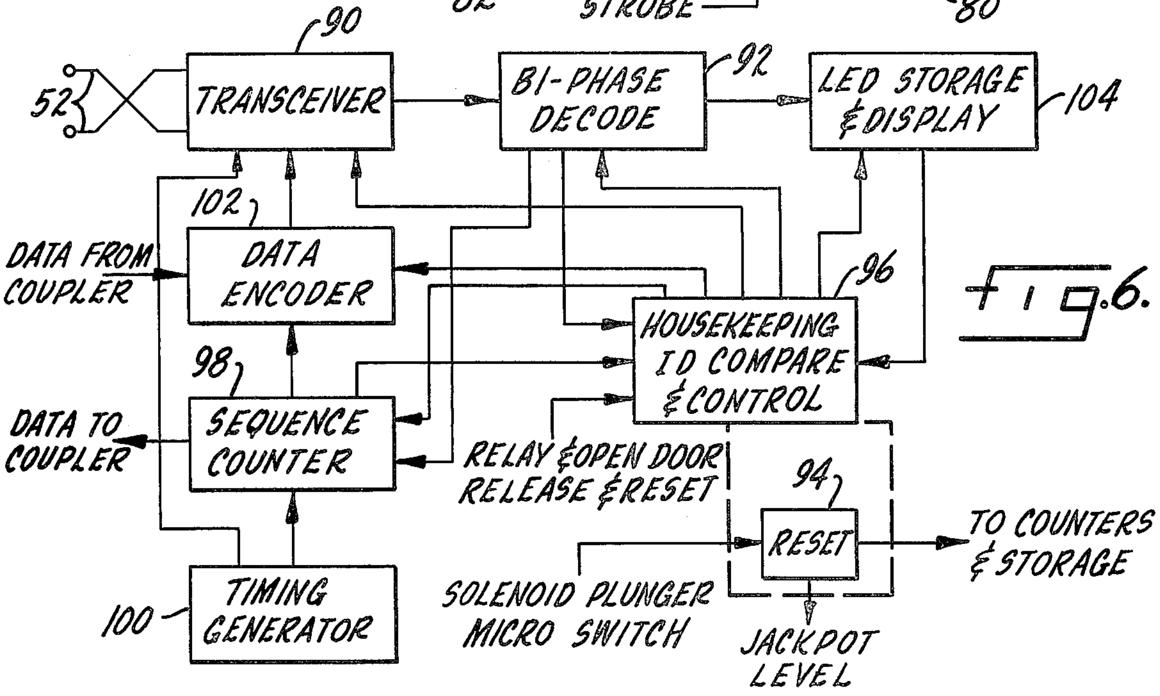
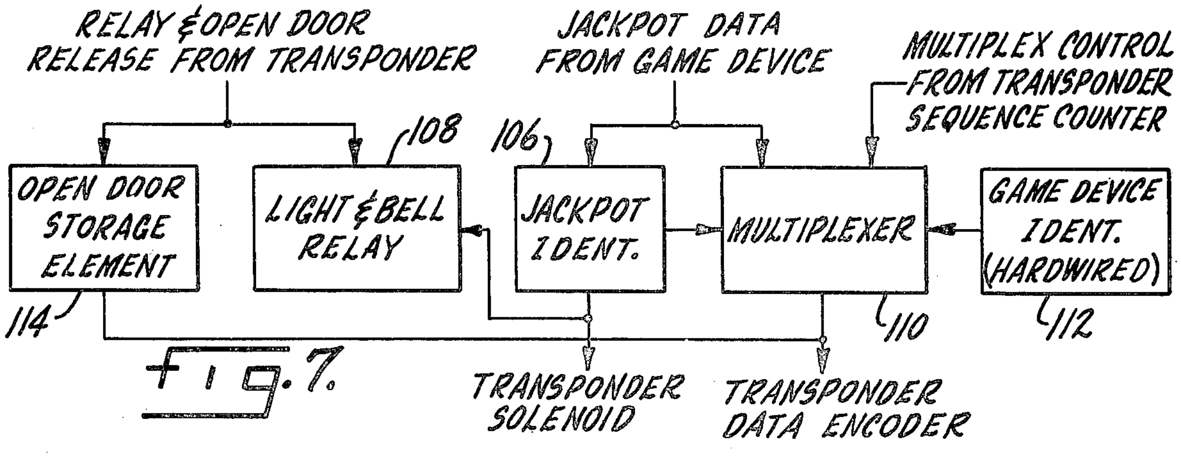
Fig. 7.

JUMP = HKP(A·B+GR)
L(CDEF) = HKP·GR
L(BG) = HKP·GR·G
HKP·A·B
HKP
G
GR
G
74161
7474
LM111
OSC
SCCLK
MØ1
MØ2
EXCLUSIVE OR
INVERTER
NAND
AND
SD
PO
MO
K1
K2
CS
+5V
DUPLEX
XMIT DUPLEX
XMIT
READ
XMIT+READ
74
76
80
82

MONITORING SYSTEM FOR USE WITH AMUSEMENT GAME DEVICES

This is a continuation of application Ser. No. 505,782, filed Sept. 13, 1974.

The present invention relates generally to a monitoring system for amusement game devices and, more particularly, to a system for providing a number of security and monitoring functions in connection with a large number of amusement game devices, such as slot machines or the like.

There have been various approaches in attempts to closely monitor the activity of amusement game devices, particularly such game devices as slot machines or the like, where a great deal of money typically passes through the game devices. In some commercial establishments, there are often several hundred or more of such devices and the amounts of money that are handled by the devices as a whole are quite large. Moreover, many of the devices do not actually pay off the jackpots that are won, and in fact require an employee of the establishment to pay off the jackpots, particularly if they exceed a certain predetermined value. Thus, one or more attendants or employees are often required to circulate through the area and make payoffs to the winning players. Various attempts to monitor the existence of jackpots have been made in the past, including the use of mechanical expedients which have been attached to the game devices and into which punched tickets or the like are inserted by an attendant when a winning player is paid off. Other approaches included the use of computers which were generally configured to function as bulk data acquisition systems into which all machines were connected, rather than as a point of transaction system. The bulk data acquisition systems that utilized a computer have been generally unacceptable for various reasons and the mechanical expedients of stamping or punching tickets or the like have also proved to be undesirable.

Accordingly, it is an object of the present invention to provide a system and apparatus that overcomes the disadvantages of the above mentioned prior systems and which is adapted for use with a computer and yet operates as a point of transaction system.

Other objects and advantages will become apparent upon reading the following detailed description, in conjunction with the attached drawings, in which:

FIG. 1 is a perspective view of a number of amusement game devices to which the system made in accordance with an exemplary present invention can be installed, and illustrates portions of the system mounted thereon;

FIG. 2 is a perspective view of a portion of the apparatus embodying the exemplary system of the present invention, and particularly illustrating one of the coupler units that is attached to the individual amusement game devices together with an insertable portable transponder which is also part of the illustrated system;

FIG. 3 is an enlarged perspective of the portable transponder shown in FIG. 2;

FIG. 4 is a block diagram broadly describing the illustrated system of the present invention, shown together with a computer to which the system is operably connected;

FIG. 5 is a schematic block diagram illustrating the operation of the interface unit of the system;

FIG. 6 is a block diagram illustrating the operation of one of the portable transponders of the system;

FIG. 7 is a block diagram illustrating the operation of one of the coupler units of the system;

Figures 8, 9, 10, 11:
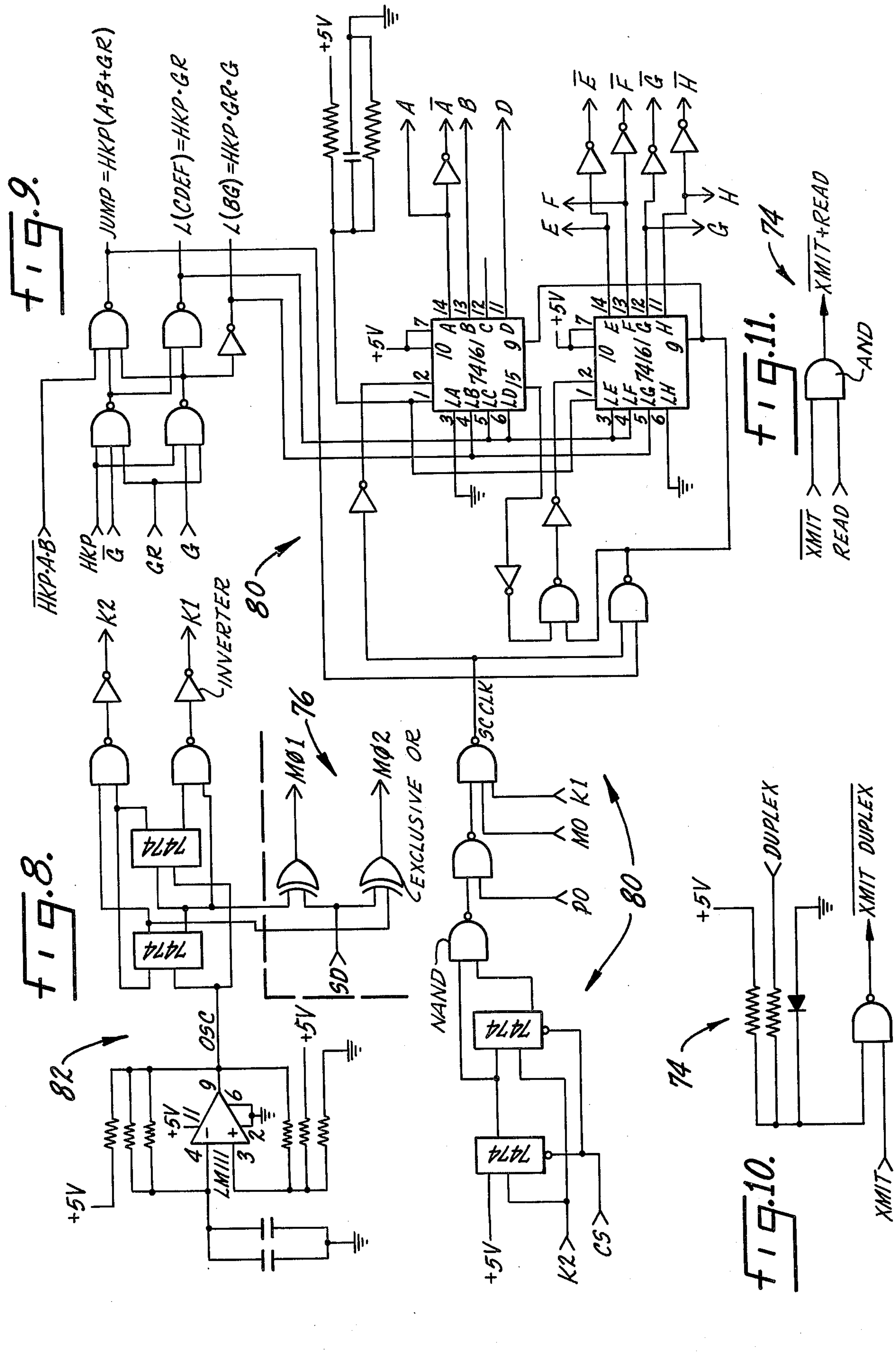
Figures 12, 13, 14, 15:
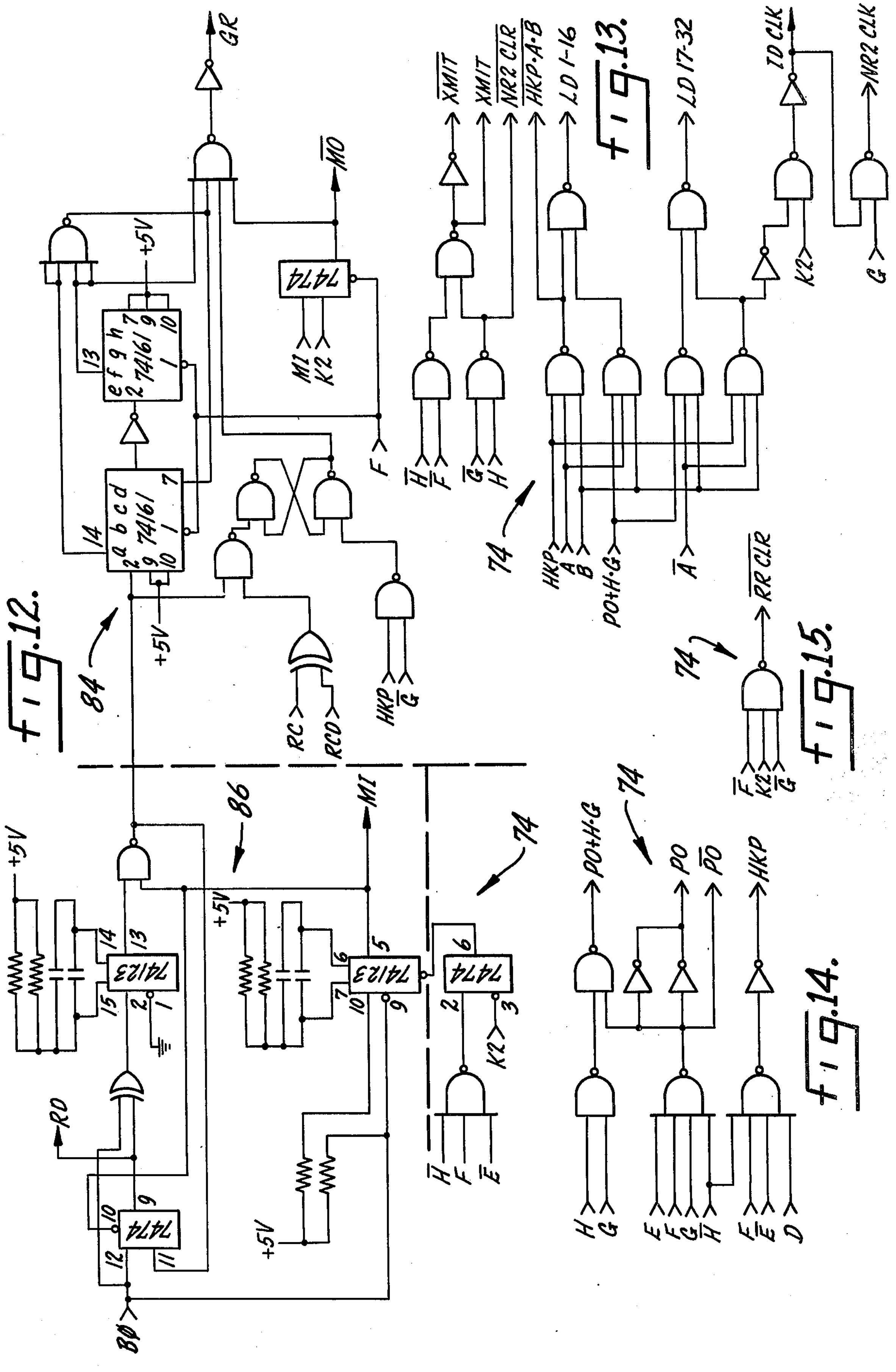
Figure 16:
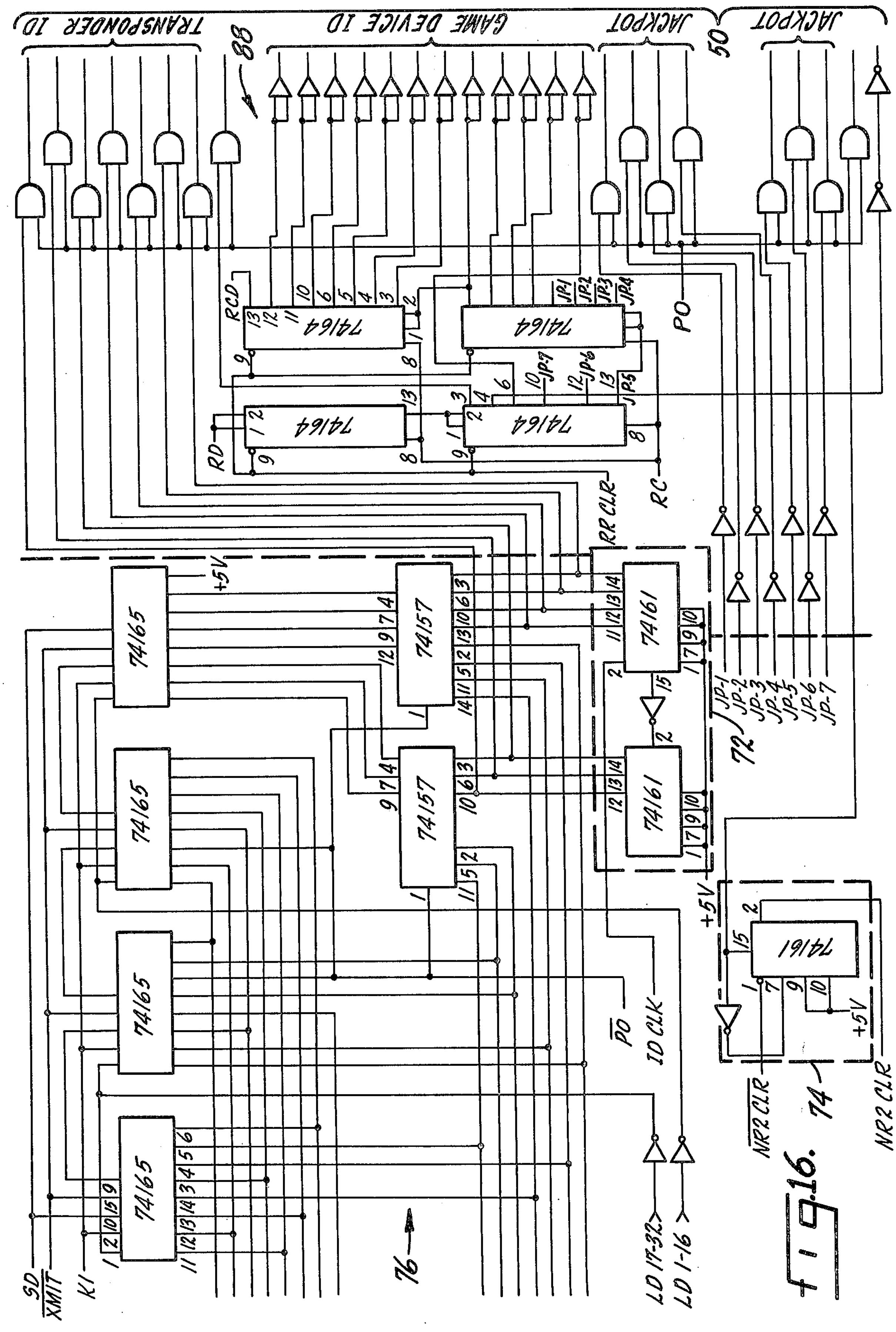
Figure 17:
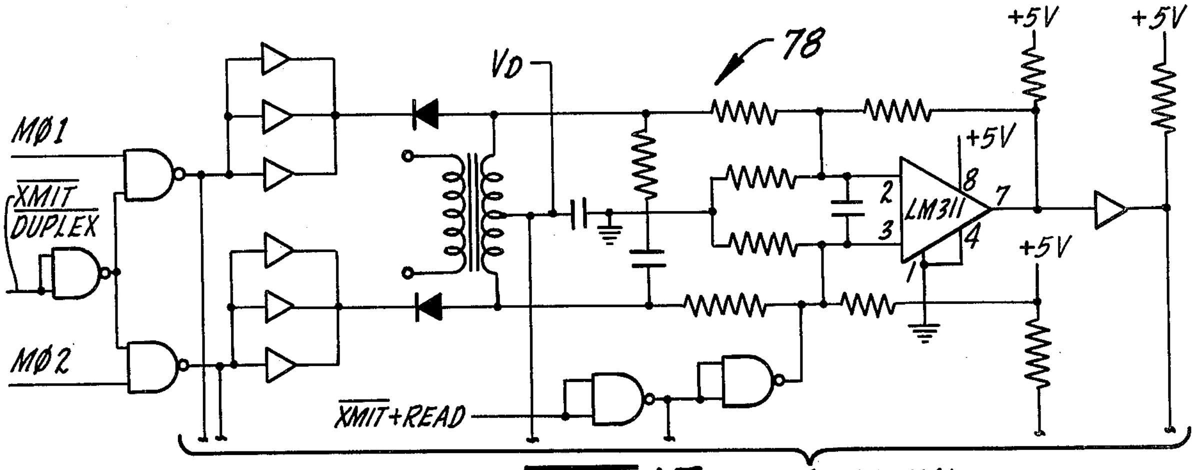
Figure 26:
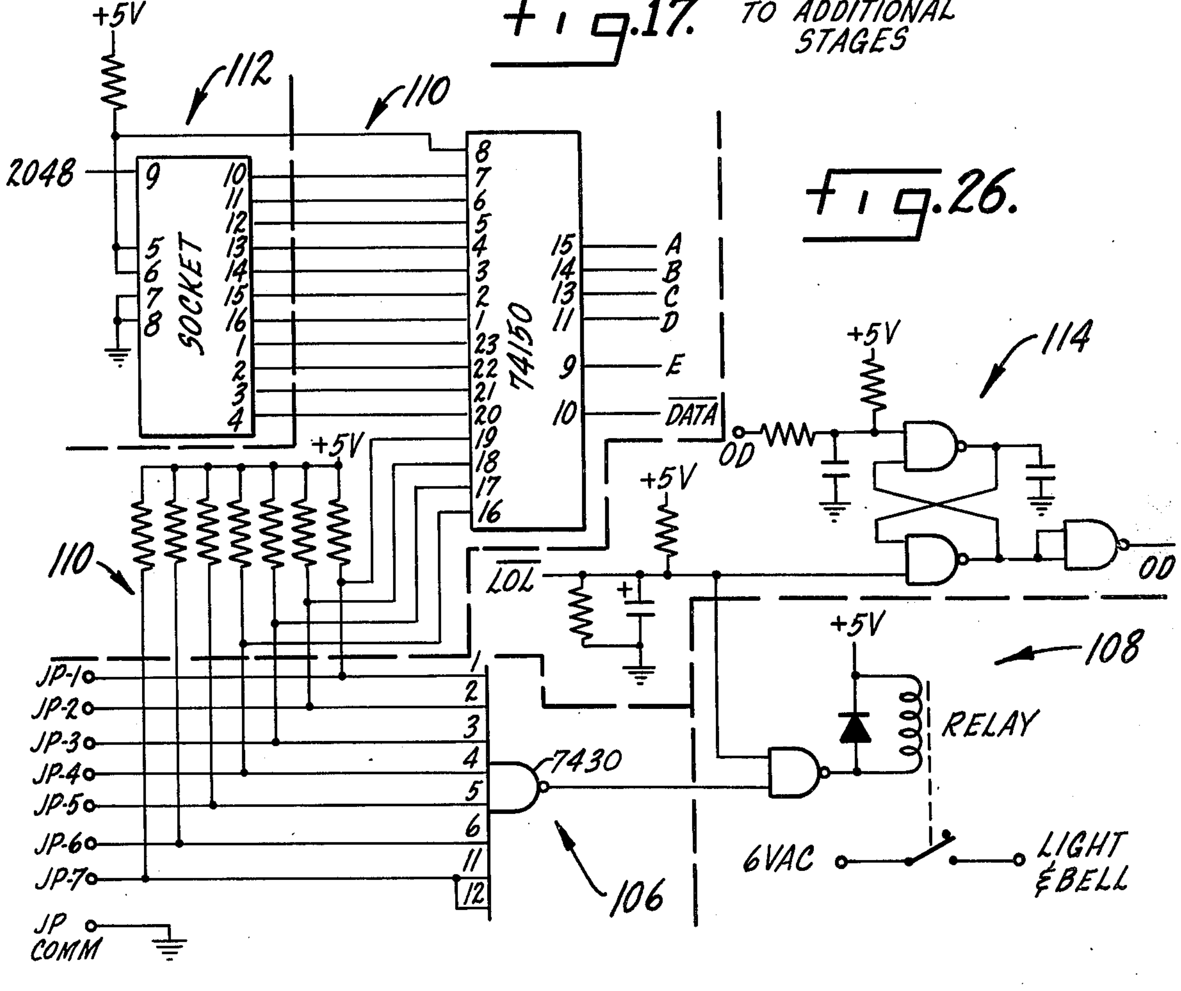
Figures 18, 19:
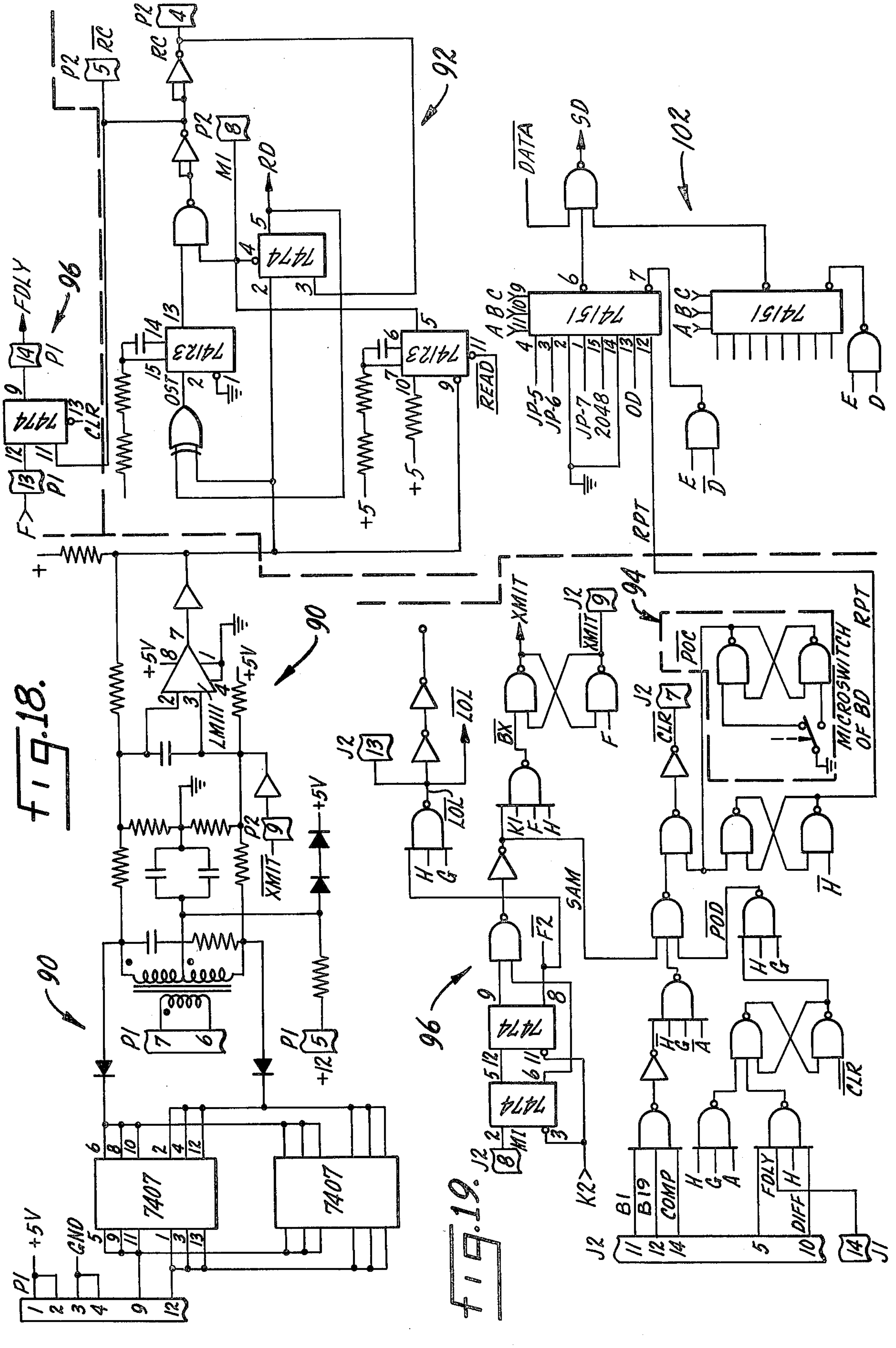
Figure 20:
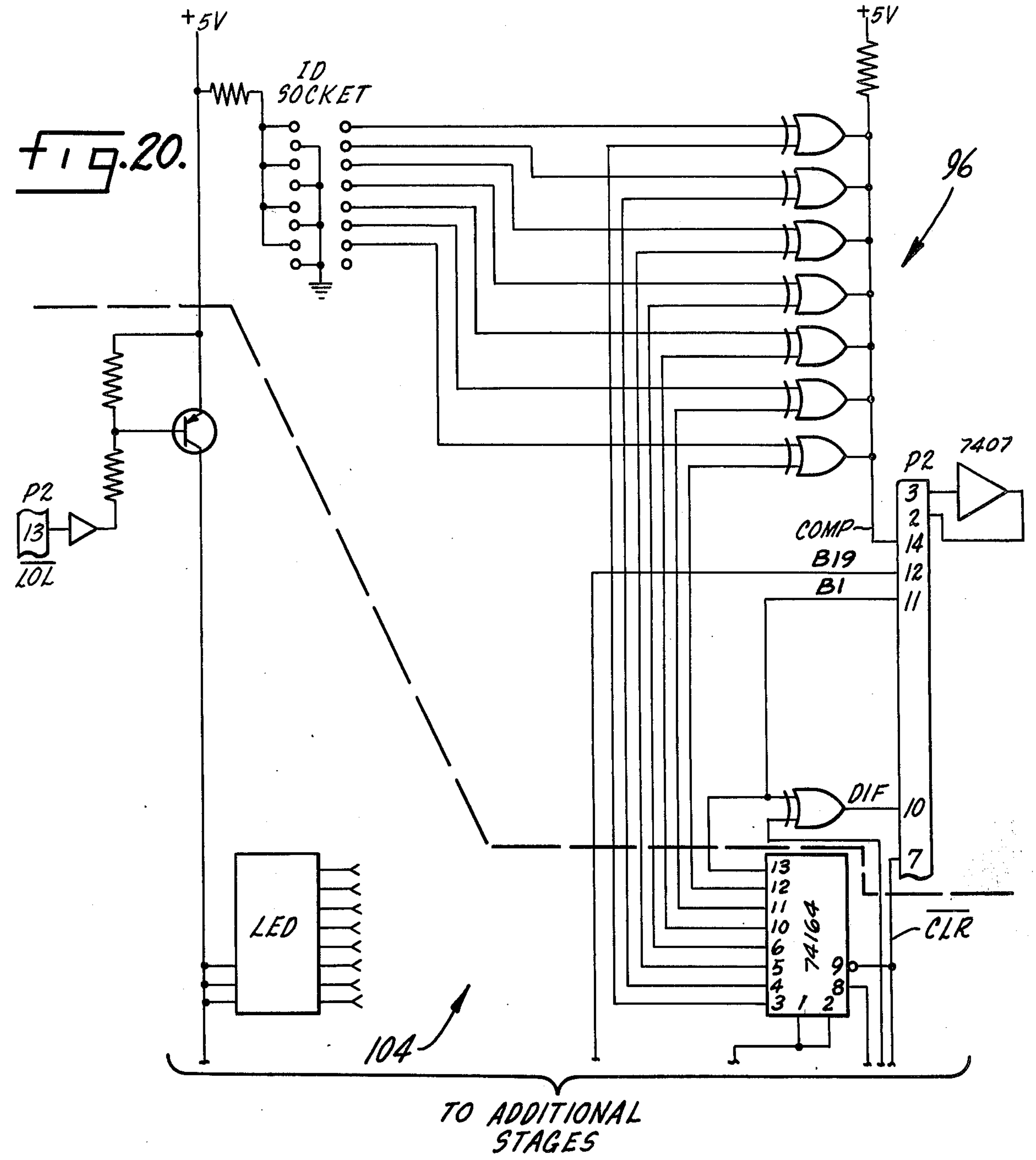
Figure 23:
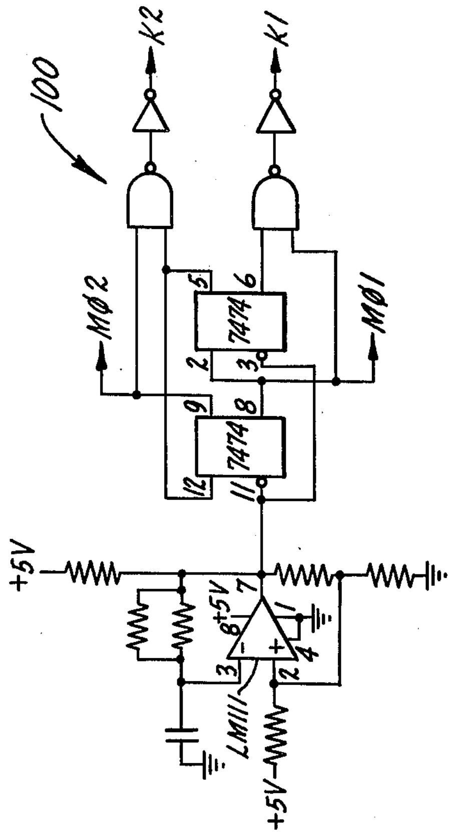
Figure 22:
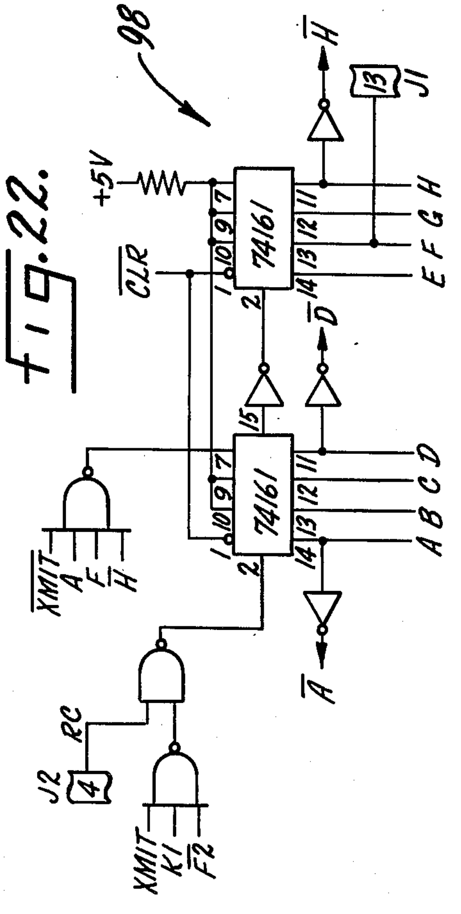
Figure 25:
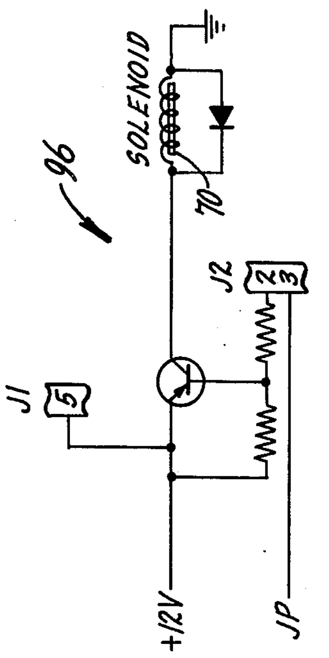
Figure 21:
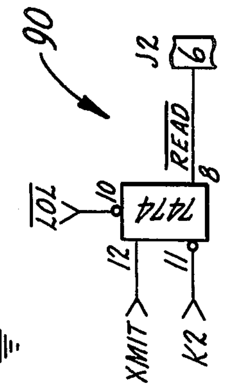
Figure 24:
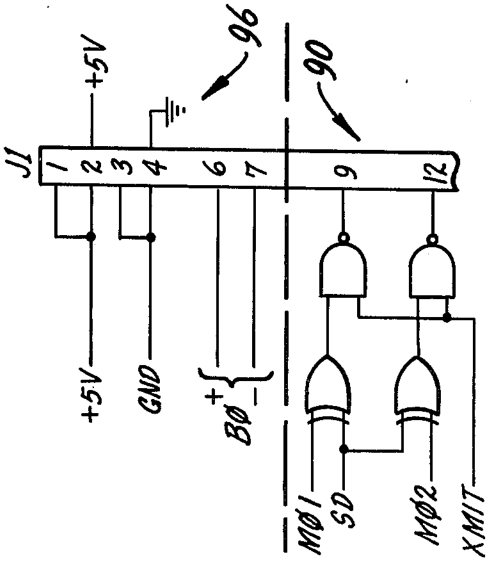

FIGS. 8 through 17, inclusive, illustrate specific circuitry that may be used to carry out the functions of the interface unit shown in the block diagram of FIG. 5;

FIGS. 18 through 25, inclusive, illustrate specific circuitry that may be used to carry out the functions of the portable transponder shown in the block diagram of FIG. 6; and, FIG. 26 illustrates specific circuitry that may be used to carry out the functions of the coupler unit shown in FIG. 7.

Broadly stated, the illustrated exemplary system embodying the present invention is particularly adapted for use in monitoring the operation of amusement game devices and particularly coin controlled amusement game devices or apparatus which are commonly referred to and known as slot machines. The system may be adapted for use with other coin controlled amusement devices where point of transaction data is useful, particularly where winning combinations or conditions of the game devices necessitate a separate accounting transaction in terms of an attendant making a payment to the winning player. The system is adapted for use with a central computer and includes a number of separate units for communicating with individual attendants that circulate in the area where the game devices are being monitored.

More specifically, the system includes an interface unit which performs a number of functions including initiating and receiving data communication with the computer, a plurality of coupler units which are individually mounted on and interconnected with the electrical circuitry of the game devices, and a number of small portable transponders which are carried by the attendants and which are connectable to any of the coupler units. When the portable transponders are inserted into the coupler units, they set into motion various data communication transactions which transpire among the interface unit, the computer, and the transponder, as well as the coupler unit, including address code signals identifying the transponder (and, hence the individual attendant) the game device with which it is connected, information concerning the size of the jackpot or winning condition of the device (which may otherwise be referred to as payout information), as well as other transactional and security information.

The system embodying the present invention then can be defined as a system that is adapted for use with a computer wherein the system extends accounting and other functions to the individual game devices, and particularly to the area where personnel are involved in making or verifying money and other transactions or maintenance. The illustrated system of the present invention type, in conjunction with the computer, does not control or affect the operation or action of the amusement game device in any manner, but merely monitors the performance of the game device and, through the use of the computer, compares the performance of the individual game devices against predetermined standards that can be programmed into the computer memory. Additionally, various accounting transactions associated with each of the individuals involved in making money transactions and the like can be recorded and a record of maintenance and other work that may be performed on individual machines can also be made.

Turning now to the drawings, and particularly FIGS. 1–4, the system is broadly shown in the environment in which it is intended to operate. A number of amusement game devices, specifically four slot machines 40 are shown installed on a common base 42. These devices may represent only a small portion of a large number of game devices that may be present in a particular establishment, such as a gambling casino or the like. In this regard, it is quite common for a given establishment to have on the order of several hundred or more individual machines and the system embodying the present invention is adapted to effectively monitor an installation of such magnitude. As previously mentioned, the illustrated system embodying the present invention comprises a number of coupler units 44, each of which is permanently mounted and wired to an individual amusement game device 40. Additionally, the system includes an interface unit 46 shown in the block diagram of FIG. 4 that is connected to a computer 48 through a two-conductor cable 50 with the interface also being connected to the individual coupler units 44 through a single two-conductor cable 52. Each of the coupler units is adapted to receive a portable transponder 54 shown in FIGS. 2 and 3 with the transponder having a rearward portion 56 housing an electrical plug (not shown) that is adapted to engage a cooperative receptacle (not shown) within the coupler unit 44. The receptacle is located inside of the outer case and is available for cooperative engagement by the plug when the transponder 54 is inserted into an elongated opening 58 located in the front face of the coupler unit. It is also preferred that a spring biased hinged door 60 or the like be provided for the coupler unit to discourage people from placing paper or other debris therein, which may detrimentally affect the operation of the system. Thus, the portable transponder 54 can be inserted into the opening 58 and in so doing, electrically connects the transponder with the coupler unit 44 which is in turn connected to the interface unit 46 through the cable 52. The portable transponders 54 are each equipped with an identification code module for communicating with the computer. As is shown in the perspective view of FIG. 3, the portable transponder 54 also has an electronic digital readout 62 located in its front face comprising four separate digits that are preferably light emitting diodes or the like which are capable of displaying all of the integers. Additionally, the use of seven segment devices as is conventional in light emitting diode displays permits the letters CALL to be displayed when necessary. If the game device has a large jackpot that can only be paid in a change booth or if some malfunction occurs, then the word CALL may be displayed. The portable transponder 54 is preferably housed in a hard impact resistant case as shown which may comprise upper and lower portions with one of the portions having a flange 64 on which a ring 66 may be attached for use with a lanyard 68 or the like that may facilitate carrying by an attendant. The use of the lanyard may substantially eliminate dropping and damaging the hand carried transponders 54 during use in the area of the game devices which may be quite crowded.

The portable transponder 54 also has a cylindrically shaped plunger 70 extending from the side thereof near the rear portion 56, with the plunger 70 being a part of an internal solenoid. The plunger 70 is spring biased in a normally extended position shown in FIG. 3 for the purpose of providing locking engagement with the coupler unit 44 when the transponder is inserted into the opening 58. Thus, once the transponder 54 is inserted into a particular coupler unit, it cannot be removed until certain data transactions are completed, which enables the activation of circuitry which energizes the solenoid to retract the plunger 70 which permits the transponder 54 to be removed.

More specifically, it is intended that the occurrence of a "jackpot" or winning condition of an amusement game device or the like cause the coupler unit to provide a light and signal which alerts attendants in the area, so that an attendant carrying a portable transponder 54 would go to the winning game device 40 and insert the transponder 54 into the coupler unit 44 of the winning game device. Through data communication among the portable transponder 54, the coupler unit 44, the interface 46 and the computer 48, the identification of the particular transponder 54 that is inserted and the identification of the coupler unit 44 (and therefore the particular game device 40) are transmitted to the interface and computer and the amount of the jackpot is sent from the computer to the transponder for display in the transponder readout 62. When all transaction communication has been concluded, and the game device has been readied for further play, i.e., the jackpot has been "played off", the transponder 54 receives a signal energizing its solenoid to retract the plunger 70 and permit the transponder to be removed from the slot 58. At this time, the attendant is free to service other game devices that have signaled a jackpot.

The interconnection between the coupler unit and the game device to which it is mounted, also provides the information regarding the amount of the jackpot. Since such game devices typically have a number of jackpots that range over varying sizes, identification of the particular jackpot that has occurred is required to accurately monitor the game devices. The transmission of the size of the jackpot can be recorded which permits a record to be made of every payoff that is made by an attendant from the money being carried and such precise accounting greatly reduces the likelihood that an attendant can make double payoffs or other transactions in an attempt to steal without being detected. Since every payoff transaction is recorded in the computer, a precise accounting of the monies being paid out by an attendant through the course of a working period can be made. Moreover, the presence of the solenoid plunger effectively precludes an attendant from quickly inserting, removing and reinserting a transponder 54 into a game device that has indicated a jackpot in an attempt to provide a repeat payoff for a single jackpot by requiring that the game device be "played off" or readied for continued play before the solenoid is energized to release the unit. Thus, once the transponder is inserted into the coupler unit 44, it cannot be removed until all the critical data is communicated through the system and the computer.

In addition to the accounting data that the system supplies to the computer, the system also supplies security information as well as maintenance information that can be recorded as well. Thus, the opening of the door to the change box or the like of the game device can be detected and transmitted to the computer when a portable transponder is inserted into the game device. In this regard, the opening of the access door preferably actuates a latch circuit or the like that effectively stores the fact that the door had been opened since the previous insertion of a transponder in the coupler unit, because the event cannot be simultaneously transmitted by the coupler unit since it only communicates with the computer when a transponder is inserted therein.

A large installation of many amusement game devices may number several hundred game devices and their successful monitoring can be performed by a single computer in conjunction with the system embodying the present invention. As previously mentioned, a coupler unit is mounted to each of the devices being monitored. If an establishment has several hundred game devices, it may be necessary that there be several dozen attendants to adequately service the game devices when they are being played. Each of the attendants carries a portable transponder 54 which generates a unique identification code or signal so that each of the transponders can be assigned to a particular attendant whose identity is thereby recorded in the computer. If the attendant is given a "bank" or sum of money and, through the course of a work shift, services a number of machines by paying off players who win jackpots, the amount of money can be cumulatively subtracted from the starting total of the "bank" and thereby provide an accurate accounting of the money paid out. Since the individual coupler units 44 are permanently mounted and wired into the game devices and effectively identify the magnitude of the various jackpots, the precise information can be fed to the computer as to which of the jackpots has been won and the computer then may relay the exact payoff information to the transponder that is inserted in the coupler unit. The transponder will thus provide a digital readout of the exact payoff that the attendant should pay the winning player.

Since many of the amusement game devices 40 may release a token percentage of the total payoff to the player immediately upon hitting a jackpot, the amount of the token payoff is known and can be subtracted by the computer program so that the difference can be displayed on the digital readout 62 of the transponder 54. Upon completion of the transaction, i.e., the attendant pays the winning player the amount displayed on the digital readout 62, the attendant or the player can then insert a coin in the game device, pull the handle which will result in the internal switches changing position to eliminate the jackpot indication. After this occurs, the computer sends a signal that is received by the transponder which actuates the solenoid and retracts the plunger 70 enabling the transponder 54 to be removed from the slot 58 of the coupler unit 44.

In keeping with the preferred embodiment of the present invention, the interface unit 46 is a single unit which need not be duplicated even though several hundred individual game devices may be connected or installed in the system. Similarly, a substantially smaller number of transponders 54 are required relative to the number of coupler units that are installed, it being understood that a coupler unit is required for each of the individual amusement game devices that is to be monitored. The significance of this comparison is that the majority of the expense of the electronic circuitry is contained within the portable transponders 54 and the interface unit 46. While a large number of coupler units are required for the monitoring of a large number of game devices, the cost of the individual coupler units are substantially less for the reason that their function is primarily to connect one of the portable transponders to the interface and to provide identification of the game device, an indication that a jackpot has occurred and the size of the particular jackpot. Although some other functions are performed by the coupler unit, the circuitry of the coupler unit is relatively simple compared to the extensive circuitry of either the interface unit 46 or the portable transponders 54.

With respect to the more detailed operational characteristics of the system embodying the present invention, the interface unit 46 effectively controls all communication to the coupler units 44 via the single preferably shielded twisted pair of conductors in the cable 52 and also interfaces data into and out of the computer 48 through the cable 50. The interface unit 46 communicates with portable transponders 54 ony when they are operably inserted in a coupler unit 44 and thus performs continuous polling or canvassing of the individual transponders which, in the system shown herein, may number up to 128 separately identifiable transponders 54. The polling is conducted by sequentially generating the unique identification codes of the transponders, waiting for a response from the transponder having the particular identification code polled and thereafter upcounting to the next successive identification code in the event that a response is not received from the previously addressed transponder. In this regard, it is understood that a transponder will not respond if it is not plugged into a coupler unit so that the polling or addressing of particular transponders will normally fail to yield a response. Of particular significance is the fact that the interface unit independently performs the polling operation and initially communicates with the transponders and only interrupts the computer to forward information to it after having received the initial information from the coupler unit and the transponder that is inserted therein. Thus, the computer is not required to actively and continuously operate the system of the present invention and may perform other functions that may be unrelated to the specific monitoring of the amusement game devices.

The illustrated system uses what is commonly referred to as bi-phase data communication over a twisted-shielded pair of conductors. The interface unit 46 performs the polling function within a 32 bit word with bit 1 being a logical one for synchronization purposes, bits 2–8 the transponder polling identification address in binary form, and bit 19 a communication direction control bit which is a logical one when the interface unit is polling the transponders 54. Bit 24 is a repeat bit used to flag the computer that a transponder unsuccessfully received payoff or other information and that the computer should attempt to transmit the information again. The other bits within the 32 bit word are not used in the polling and can be in any state or condition.

If a transponder 54 is "on line", i.e., it is operably connected to a coupler unit, it will eventually be addressed by the interface unit and, if bits 1 and 19 are logical ones, the transponder will respond before the interface unit can poll the next successive address or identification code. The transponder 54 response will also be a 32 bit word which contains the game device identification, the jackpot identification, as well as other information such as open door information. The interface unit will address the transponder 54 a second time, and the transponder must transmit the identical 32 bit word. It is also pointed out that bits 2–12 and bit 21 are preferably game device identification codes in binary form which allows the system disclosed in the drawings herein to monitor a maximum of 4,080 game devices if desired. Bits 13–18 and bit 20 are the jackpot identification codes. When bit 19 is a logical zero, it indicates that the transponder 54 is transmitting data to the interface unit 46.

The successful reception of both 32 bit words from the transponder 54 will result in the interface unit 46 assembling the response for transfer to the computer 48. At that time, the interface unit interrupts and clocks the assembled information to the input ports of the computer and thereafter waits for a reply from the computer. The computer will then respond with payoff data to display on the portable transponder 54 and this payoff data is also in the form of two identical 32 bit words which the portable transponder 54 also compares for identity. The system has the transponder "locked on line" from the time the interface unit 46 successfully polls the particular transponder until it receives the payoff data. After the transponder receives the payoff data, it then releases to allow the interface unit to poll other transponders that might be inserted in a coupler unit. It is also noted that the portable transponder will retain the payoff data on its digital display until the jackpot is played off, i.e., a coin is inserted and the handle pulled which releases the winning combination at which time the transponder clears its display and activates the solenoid to retract the plunger enabling the transponder to be removed from the coupler unit.

If the response from a polled transponder 54 is in error because of incorrect length or the like, the interface unit 46 will disregard the response and revert to its polling mode to sequence through the various addresses and will eventually address the same transponder again. If the payoff response from the interface unit 46 is in error for similar reasons, the transponder 54 will similarly disregard the payoff data, generate a repeat bit and will wait to be polled again. The interface unit circuitry forces it to begin polling after it sends payoff data and, accordingly, the transponder 54 will eventually be addressed again. The transponder second response to the interface unit would then include the repeat bit which the interface unit would forward to the computer advising that this is a repeat communication of the previous jackpot.

It should be understood that the logic illustrated by the block diagrams of FIGS. 5 through 7 could be implemented by various circuit arrangements. A specific circuit arrangement is shown in FIGS. 8 through 26 with the logic circuit of each of the blocks being indicated by referenced numbers of the blocks.

In keeping with the present invention, the functional block diagram of the computer interface unit 46 is shown in FIG. 5. The specific electrical circuitry of the interface unit is shown in FIGS. 8 through 17. In this regard, the circuitry shown in FIGS. 8–26 have industry standard identification numbers and pin number designations for those integrated circuits that comprise more than simple gate or other functions. The specific circuitry of such integrated circuits is incorporated by reference herein.

The interface unit operates on five basic logical sections or sequence states which poll and receive bi-phase data, transfer data to the computer, receive data from the computer and transmit non-polling bi-phase data. The interface unit includes a transponder identification or address counter 72 which is incremented or upcounted by a control circuit 74 which enables a data encoder 76 that places a transceiver 78 into its transmit mode for transmission of that particular transponder identification address through the cable 52 connected to all of the coupler units 44. It is noted that there may be a number of transceivers 78 in a large installation, since the length of individual cables to the game devices have practical limits which are preferably less than about 1,500 feet. Thus, from about 100 to about 200 devices can be controlled per line and a transceiver is required for each line. After the transmission of the particular address has been performed, the control circuit 74 places the transceiver 78 into its receive mode where it waits to receive a possible response. If no response occurs within a predetermined time period or window, the control circuit 74 then increments the counter 72 to address another transponder, enable the encoder 76 and place the transceiver 78 back into the transmit mode for transmitting the new address.

During this perpetual polling operation, the control circuit 74 is controlled by the state of a sequence counter 80 which is incremented by a timing generator 82 or preset by a housekeeping logic circuit 84. Assuming that a particular addressed transponder 54 is in fact operably inserted in a coupler unit 44, that transponder will respond within the window or time period previously described. The response is received by the transceiver 78 which presents the data to a bi-phase decoder 86 which in turn presents the decoded data to a storage register 88 for holding of the response data. The control logic 74 will have locked the transponder ID counter 72 on the address of the particular transponder and will cause the counter to poll the same transponder again. The second response of the transponder is also stored in the storage register 88 and the interface unit then performs tests to determine if both of the responses comprise 32 bit words and are identical, as well as to determine if the communication control bit is in its proper state or condition. If the responses pass these tests, then the control circuit 74 enables the buffer circuit 88 and interrupts the computer to present the response data, the identification of the particular transponder and the other housekeeping data.

At this point, the interface logic goes into a wait state or condition where no polling is performed until the computer responds with payoff information. This is performed by the computer strobing the sequence counter 80 which advances its count such that the control circuit 74 enables the data encoder 76 to receive data from the computer. The data is entered into the shift register of the encoder 76 and shifted out to the transceiver 78 for transmission to the particular transponder 54 that has been locked on line. The transmission of payoff data is followed by the start of polling at that same particular transponder address. This is done so that if the transponder rejects the payoff data, the beginning of the polling at the same address provides an opportunity for that transponder to respond once again and the computer sends the same payoff data a second time. However, if both responses from the particular transponder are not equal or if the response does not have the proper 32 bit word length or if other housekeeping data is incorrect, the control circuit 74 is forced by the housekeeping logic 84 and sequence counter 80 to increment the counter 72 to the next address and thereby continue polling once again.

Turning now to FIG. 6, there is shown a block diagram illustrating the functional operation of the transponders 54. The detailed circuitry shown in FIGS. 18 through 25 may be used to carry out the functional operation shown and described with respect to FIG. 6. Prior to describing the block diagram in detail, it should be understood that the portable transponders 54, in addition to having the structural and functional features that have been heretofore described also receive the game device identification code as well as the particular jackpot code from the coupler unit when it is inserted therein. The device identification and jackpot codes are shifted into the transmit logic of the portable transponder via the single electrical connection between the coupler unit and the transponder and, by virtue of this single connection, effectively prohibits any potential attempts at rigging jackpot codes by tampering with a transponder connector.

When a transponder is operably inserted into a coupler unit 44, the transponder will receive polling information in bi-phase form by a transceiver 90 which has been enabled to receive by a bi-phase decoding circuit 92 in its initial state. This initial state is reset by the solenoid plunger 70 activating a reset circuit 94. A housekeeping and control circuit 96 continuously compares the polling or address information that is sent by the computer interface unit 46, in effect comparing the polling address information with a hardwired address code that is internally generated in each of the transponders 54 which address code is unique for each of the individual transponders. When the address of the polling data identically compares with the internally generated address of the transponder 54, the housekeeping and control logic circuit 96 switches from receive to transmit mode. During the receive mode, a sequence counter 98 is controlled by the bi-phase decoder 92. However, when the transponder recognizes its address, the control logic 96 permits a timing generator 100 to perform a clock function within the transponder.

In the transmit mode, the transponder acquires data from the coupler unit in which it is inserted, the data entering an encoder 102. This data is then multiplexed by the sequence counter 98 and is simultaneously routed to the transceiver 90 as a response. Other data is also routed to the data encoder 102 by the housekeeping and control logic circuit 96 for transmittal of security and mode control information. A successful response of the transmitted data from the transponder to the interface unit results in the transponder being interrogated again, whereupon it will perform the transmission of data a second time as described. The transponder will then wait for the payoff data from the interface unit which means that the transponder reverts to a receive state or condition. The second response and the receipt of the payoff data are controlled by the state of the sequence counter 98. The receipt of payoff data which comprises two consecutive data bursts of 32 bit words is loaded into a LED storage circuit 104 and the display 62 is actuated to read the contents of the storage. A successful receipt of payoff data results in the housekeeping and control logic 96 releasing the light and bell relay in the coupler unit as will be described herein. This action allows the jackpot to be played off of the game device and, once the jackpot is played off, the solenoid within the transponder is energized which allows the transponder to be removed from the coupler unit.

The coupler unit block diagram is illustrated in FIG. 7 and its detailed circuitry shown in FIG. 26. As previously mentioned, the circuitry of the coupler unit 44 is substantially less complex compared to the circuitry of either the interface unit or the transponders. This is desirable since there are a comparatively larger number of coupler units than portable transponders and only a single interface unit 46. The coupler unit 44 performs no function until a jackpot occurs on the game device 40 to which it is mounted. At that time, the coupler unit jackpot identification circuit 106 energizes a relay 108 which will effect illumination of a light and energization of a bell which will alert the attendant in the area that a jackpot has occurred. The attendant carrying a portable transponder 54 will then insert the transponder into the coupler unit whereupon the jackpot identification circuit 106 will allow the reset solenoid to be energized which in turn allows the transponder to oprate from an initialized state. The transponer 54 sends multiplex control data to a multiplexer circuit 110 which multiplexes jackpot and identification from circuit 106 and slot machine identification data from circuit 112 to the portable transponder. After the transponder has successfully received payoff data, it will release the light and bell relay 108, and reset an open door latch 114 in the event it had previously been set.

The specific circuit diagram shown in FIGS. 8–26 have input and output signal designations indicated thereon which are different from the numerical designators of the block diagram shown in FIGS. 5–7. These signals carry alphabetical designators which are shown in the following Tables 1–3 together with the description and origin of each of the signals. The Tables 1–3 are associated with the specific signals of the interface unit 46, the transponders 54 and the coupler units 44, respectively.

TABLE 1

| INTERFACE UNIT | | |
|---|---|---|
| Signal | Description | Origin |
| Bϕ | Undemodulated bi-phase data | Transceiver 78 (FIG. 17) |
| Mϕ1, | Data transmit control | Data encoder 76 (FIG. 8) |
| Xϕ2 | Data transmit control | Data encoder 76 (FIG. 8) |
| K1 | Phased clock signal | Timing Generator 82 (FIG. 8) |
| K2 | Phased clock signal | Timing Generator 82 (FIG. 8) |
| A, $\overline{A}$ | Timed sequence data control | Sequence counter 80 (FIG. 9) |
| B | Timed sequence data control | Sequence counter 80 (FIG. 9) |
| D | Timed sequence data control | Sequence counter 80 (FIG. 9) |
| E, $\overline{E}$ | Timed sequence data control | Sequence counter 80 (FIG. 9) |
| F, $\overline{F}$ | Timed sequence data control | Sequence counter 80 (FIG. 9) |
| G, $\overline{G}$ | Timed sequence data control | Sequence counter 80 (FIG. 9) |
| H, $\overline{H}$ | Timed sequence data control | Sequence counter 80 (FIG. 9) |
| XMIT, $\overline{XMIT}$ | Mode control of transceiver | Control circuit 74 (FIG. 13) |
| $\overline{NR2}$ $\overline{CLR}$ | Error counter clear | Control circuit 74 (FIG. 13) |
| HKP · A · B | Housekeeping at sequence state A & B | Control circuit 74 (FIG. 13) |
| LD-16 | Strobe for encoder | Control circuit 74 (FIG. 13) |
| LD 17-32 | Strobe for encoder | Control circuit 74 (FIG. 13) |
| ID CLK | Counter clock | Control circuit 74 (FIG. 13) |
| NR2 CLK | Error counter clock | Control circuit 74 (FIG. 13) |
| HKP | General control signal | Control circuit 74 (FIG. 14) |
| PO, $\overline{PO}$ | Pay out controls | Control circuit 74 (FIG. 14) |

TABLE 1-continued

| INTERFACE UNIT | | |
|---|---|---|
| Signal | Description | Origin |
| PO+H · G | Pay out control at seq. state H&G | Control circuit 74 (FIG. 14) |
| RR CLR | Reset shift register | Control circuit 74 (FIG. 15) |
| RCD | Read clock data | Storage Register 88 (FIG. 16) |
| XMIT $\overline{\text{DUPLEX}}$ | Interface enable control from Computer | Control Circuit 74 (FIG. 10) |
| $\overline{\text{XMIT}}$ + READ | Control signal to read at $\overline{\text{XMIT}}$ time | Control circuit 74 (FIG. 11) |
| RD | Read demodulated data | Bi-phase Decoder 86 (FIG. 12) |
| MI | Level indicating receiving of data word | Bi-phase Decoder 86 (FIG. 12) |
| $\overline{\text{MO}}$ | Synchronization in error mode detection (Signal MI phase clocked) | Housekeeping 84 (FIG. 12) |
| GR | Good Response | Housekeeping 84 (FIG. 12) |

TABLE 2

| TRANSPONDER UNIT | | |
|---|---|---|
| Signal | Description | Origin |
| $\overline{\text{READ}}$ | False state of read data | Bi-phase Decoder 92 (FIG. 18) |
| K1 | Phased clock signal | Timing Generator 100 (FIG. 18) |
| K2 | Phased clock signal | Timing Generator 100 (FIG. 18) |
| MF1 | Data transmit control | Timing Generator 100 (FIG. 18) |
| MF2 | Data transmit control | Timing Generator 100 (FIG. 18) |
| RC | Read clock | Bi-phase Decoder 92 (FIG. 18) |
| RD | Read date | Bi-phase Decoder 92 (FIG. 18) |
| FDLY | Signal F. delayed | Housekeeping 96 (FIG. 18) |
| XMIT, $\overline{\text{XMIT}}$ | Mode control of transceiver | Housekeeping 96 (FIG. 19) |
| LOL | False state of lock off line | Housekeeping 96 (FIG. 19) |
| POC | Initialize signal | Housekeeping 96, (FIG. 19) |
| PPT | Repeat signal | Housekeeping 96 (FIG. 19) |

TABLE 3

| COUPLER UNIT | | |
|---|---|---|
| Signal | Description | Origin |
| GP1 through 7 | Jackpot identity | Game Device 106 (FIG. 26) |
| A, B, C, D, E | Sequence states from transponder | Multiplexer 110 (FIG. 26) |
| OD | Open door signal | Storage element 114 (FIG. 35) |
| DATA | Multiplex data | Multiplexer 110 (FIG. 26) |

From the above description of the operation of the system, it is evident that the system has many unique and desirable features that enable it to provide accurate accounting, maintenance and monitoring functions for a large number of game devices. The capability of providing a detailed record of every payoff that is made by an attendant is an effective deterrent to stealing. Moreover, the data that is communicated to the computer may be used to provide performance logs and maintenance schedules as well as other records that may be desired.

The system incorporates several data communication redundancy safeguards to insure the accuracy of the information being transmitted and received, as has been described herein. Moreover, it is repeated that the system has no control over the operation of the individual devices and merely monitors the operation of the devices.

Although various embodiments of the present invention have been shown and described, they will suggest a number of variations and modifications to persons skilled in the art. Accordingly, the scope of the protection to be afforded this invention should not be limited by the particular embodiments shown and described, but should be determined in terms of the definitions set forth in the appended claims and equivalents thereof.

Various features of the invention are set forth in the following claims.

What is claimed is:

1. A system for monitoring the operation of a plurality of amusement game devices, the system being adapted for use with a computer and comprising the combination:

coupler means associated with and electrically connected to each of said devices being monitored, said coupler means being adapted to generate electrical signals indicating the identity of the machine to which it is associated and the identity of predetermined winning conditions, interface means electrically connected to each of said coupler means and adapted to selectively communicate with the computer and with said coupler means and transponder means, said interface means sequentially generating address identification signals for polling individual portable transponder units, at least one portable transponder means adapted to communicate with said interface means and with one of said coupler means when connected thereto, said transponder means responding to its unique address identification signal when connected to one of said coupler means by transmitting information to the interface means and the computer concerning the game device identification and, transponder means identification, predetermined winning condition identification of the game device.

2. A system as defined in claim 1 wherein each of said transponder means has a visual display for providing a readout of information received from the computer subsequent to transmission of said identification information by said transponder means.

3. A system as defined in claim 2 wherein said display comprises a number of light emitting diodes, each having a number of segments that can be selectively illuminated to display the integers, said display being adapted to provide a readout of the value of the winning condition.

4. A system as defined in claim 1 wherein each of said coupler means is mounted to one of said game devices and has a connector for engaging a cooperative connector of said transponders so that said transponders can be physically and electrically connected thereto.

5. A system as defined in claim 4 wherein each of said coupler means has an outer case and an opening therein in which a portion of said transponders can be inserted, the insertion of one of said transponders therein a predetermined distance engaging said cooperative connectors together.

6. A system as defined in claim 1 wherein each of said transponder means has an electrically actuable solenoid therein with a solenoid plunger that is normally biased outwardly thereof adapted to engage a recess or the like associated with said coupler means when said transponder means is connected thereto, said plunger prohibiting release from said coupler until said solenoid is energized in response to receiving a predetermined signal.

7. A system as defined in claim 6 wherein said solenoid energization signal is provided in response to the game device being played which causes said winning condition to be eliminated.

8. A system as defined in claim 1 wherein connection of one of said transponder means in one of said coupler means causes said coupler means to transfer game device identification and predetermined winning condition identification into said transponder means for transmission to said interface means.

9. A system as defined in claim 1 wherein said coupler means of each of the game devices detects a winning condition thereon and activates audio and visual indicators which alert people that such condition has occurred.

10. A system as defined in claim 1 wherein said coupler means also provide signals indicating whether a door of the game device has been opened.

11. A system for monitoring the operation of a plurality of game devices, wherein individually identifiable attending personnel are employed to verify a predetermined game condition, the system being adapted for use with a computer and comprising attachment means associated with and electrically connected to each of said monitored game devices and capable of being enabled to transmit a signal responsive to the occurrence of a predetermined condition of the game device and a signal identifying the game device, a portable device including means for identifying individually each of the attending personnel, said attachment means including means for receiving said portable device and sensing said identifying means, and interface means electrically connected to each of said attachment means and adapted to selectively communicate with the computer and with said attachment means, said interface means including means for generating address identification signals for polling individual attachment means, said attachment means including means responding to its address identification signal for transmitting the signal responsive to the occurrence of the predetermined condition of its associated game device and the signal identifying the game device, and said interface means including means acting in response to the insertion of said portable device for transmitting from the computer to the attachment means information enabling the attending personnel to verify said predetermined condition of the associated game device.

12. A system as defined in claim 11 comprising means for providing a visual display of the information enabling the attending personnel to verify said predetermined condition of the associated game device.

13. A system as defined in claim 11 wherein said attachment means includes a transponder and a coupler means for interconnecting the transponder to the game device.

14. A system as defined in claim 13 wherein said transponder includes means for providing a visual display of the information enabling the attending personnel to verify said predetermined condition of the associated game device.

15. A system as defined in claim 12 wherein said visual display means is disposed in said portable device.

16. A system as defined in claim 12 wherein the visually displayed information is provided by said interface means.

17. A system as defined in claim 11 wherein said portable device comprises a transponder.

18. A system as defined in claim 11 wherein said predetermined game condition is a winning condition.

19. A system as defined in claim 11 wherein said predetermined game condition includes winning and maintenance related conditions associated with the game devices.

* * * * *

UNITED STATES PATENT AND TRADEMARK OFFICE
CERTIFICATE OF CORRECTION

PATENT NO. : 4,072,930

DATED : February 7, 1978

INVENTOR(S) : Andres R. Lucero, Roy E. Gilbert, Jack H. Stevens

It is certified that error appears in the above-identified patent and that said Letters Patent are hereby corrected as shown below:

Column 2, line 46, after "attendant)" insert --and--.

Column 2, line 56, after "other" insert --type--.

Column 6, line 13, change "ony" to --only--.

Column 10, line 30, change "oprate" to --operate--.

Column 10, line 31, change "transponer" to --transponder--.

Column 10, (TABLE 1), line 3 under the 'Signal' column, change "Xϕ2" to --Mϕ2--.

Column 10, (TABLE 1), line 16 under the 'Signal' column, change "LD-16" to --LD1-16--.

Column 11, (TABLE 2), lines 2, 3, 4, 5 under the 'Origin' column, change "(FIG. 18)" to --(FIG. 23)--.

Column 11, (TABLE 2), line 4, under the 'Signal' column, change "MF1" to --Mϕ1--.

Column 11, (TABLE 2), line 5 under the 'Signal' column, change "MF2" to --Mϕ2--.

UNITED STATES PATENT AND TRADEMARK OFFICE
CERTIFICATE OF CORRECTION

PATENT NO. : 4,072,930

DATED : February 7, 1978

INVENTOR(S) : Andres R. Lucero, Roy E. Gilbert, Jack H. Stevens

It is certified that error appears in the above-identified patent and that said Letters Patent are hereby corrected as shown below:

Column 11, (TABLE 2), line 12 under the 'Signal' column, change "PPT" to --RPT--.

Column 11, (TABLE 3), line 1 under the 'Signal' column, change "GP1" to --JP1--.

Column 11, (TABLE 3), line 3 under the 'Origin' column, change "(FIG. 35)" to --(FIG. 26)--.

Signed and Sealed this

*Tenth* Day of *April 1979*

[SEAL]

*Attest:*

RUTH C. MASON
*Attesting Officer*

DONALD W. BANNER
*Commissioner of Patents and Trademarks*

UNITED STATES PATENT AND TRADEMARK OFFICE

CERTIFICATE OF CORRECTION

PATENT NO. : 4,072,930

DATED : February 7, 1978

INVENTOR(S) : Andres R. Lucero, Roy E. Gilbert, Jack H. Stevens

It is certified that error appears in the above-identified patent and that said Letters Patent are hereby corrected as shown below:

Column 1, line 51, change "the" to --an exemplary--.

Column 1, line 52, change "an exemplary" to --the--.

Signed and Sealed this

*Thirty-first* Day of *July 1979*

[SEAL]

*Attest:*

LUTRELLE F. PARKER

*Attesting Officer* *Acting Commissioner of Patents and Trademarks*